US012627849B1

(12) United States Patent
Srivastava et al.

(10) Patent No.: US 12,627,849 B1
(45) Date of Patent: May 12, 2026

(54) DYNAMIC MULTI-AUDIO BROADCASTING

(71) Applicant: Amazon Technologies, Inc., Seattle, WA (US)

(72) Inventors: Nitin Srivastava, Santa Clara, CA (US); Muhaiyadeen Ansarullah Habibullah, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/608,157

(22) Filed: Mar. 18, 2024

(51) Int. Cl.
*H04N 21/43* (2011.01)
*H04N 21/81* (2011.01)

(52) U.S. Cl.
CPC ..... *H04N 21/4307* (2013.01); *H04N 21/8106* (2013.01); *H04N 21/812* (2013.01)

(58) Field of Classification Search
CPC ........... H04N 21/4307; H04N 21/8106; H04N 21/812
See application file for complete search history.

(56) References Cited

U.S. PATENT DOCUMENTS

| | | | | |
|---|---|---|---|---|
| 10,485,049 B1 * | 11/2019 | Batta | ..................... | H04W 76/15 |
| 10,542,574 B1 * | 1/2020 | Jorgovanovic | ...... | H04W 36/035 |
| 11,122,637 B1 * | 9/2021 | Habibullah | ........... | H04W 76/10 |
| 11,722,746 B2 * | 8/2023 | Lewis | ................ | H04N 21/2662 725/87 |
| 12,192,560 B2 * | 1/2025 | Soh | ..................... | H04N 21/8106 |
| 12,273,232 B2 * | 4/2025 | Ramanadham | ..... | H04L 41/0816 |
| 12,353,179 B1 * | 7/2025 | Drilling | ................ | G05B 15/02 |
| 2014/0259136 A1 * | 9/2014 | Levy | ..................... | H04L 67/104 726/7 |

* cited by examiner

*Primary Examiner* — Helen Shibru
(74) *Attorney, Agent, or Firm* — Pierce Atwood LLP

(57) ABSTRACT

A media playback system may send video data to a first device and audio data to a second device. The second device may wirelessly transmit the audio data to one or more listening devices such as earbuds or headphones. The system may also send audio data to the first device for transmission to another listening device or devices. In an example operation, the system may send audio data representing a first language to the first device and a second language to the second device. In this manner, users can watch the same video while listening to audio in their chosen language. In some cases, one device may transmit audio data using a one-to-one wireless protocol while the other device uses a one-to-many wireless protocol. The first device may send synchronization data to the second device such that playback (e.g., transmission) of the audio data aligns with playback of the video.

18 Claims, 9 Drawing Sheets

Figure 3:
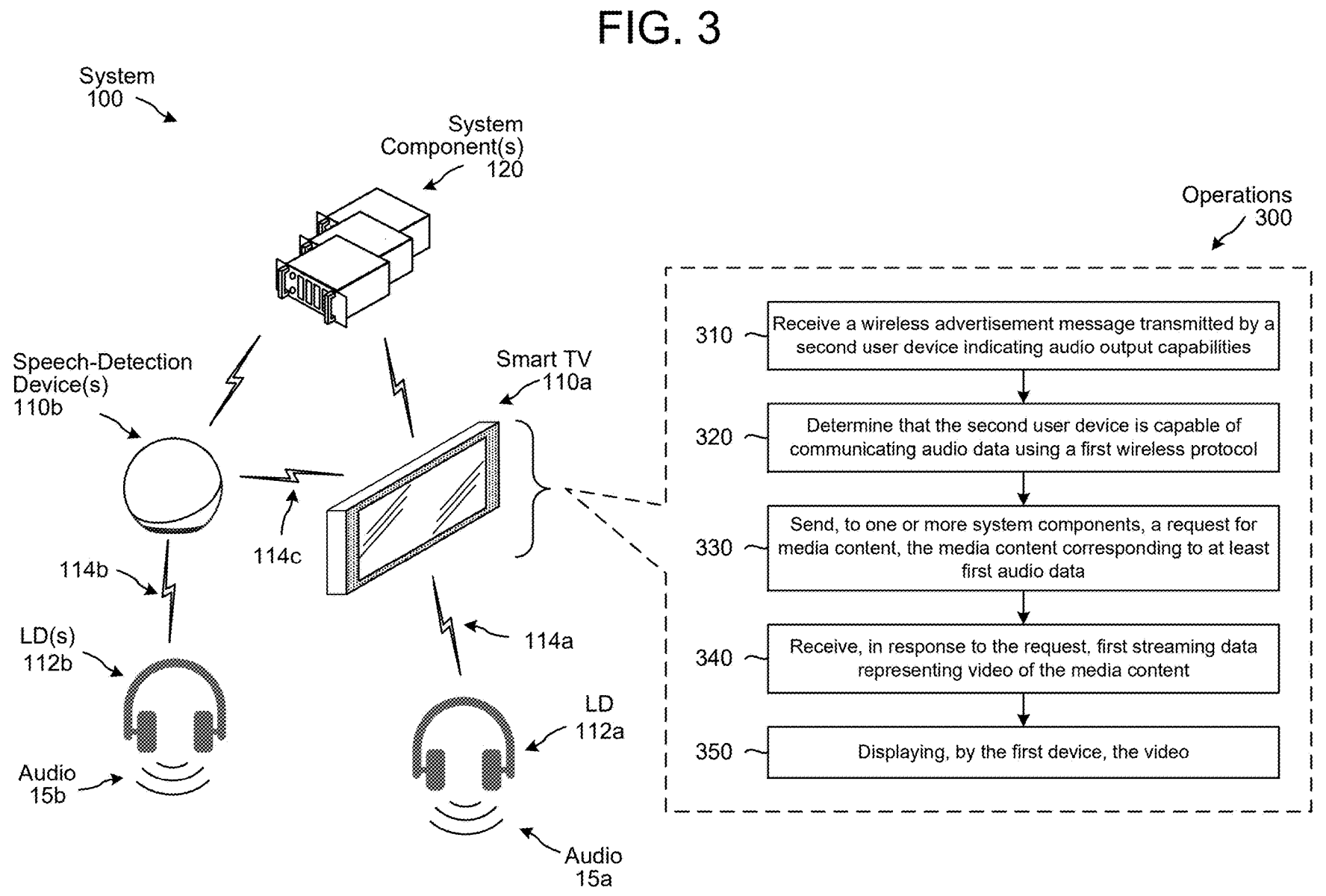

Operations 300

310 Receive a wireless advertisement message transmitted by a second user device indicating audio output capabilities 320 Determine that the second user device is capable of communicating audio data using a first wireless protocol 330 Send, to one or more system components, a request for media content, the media content corresponding to at least first audio data 340 Receive, in response to the request, first streaming data representing video of the media content 350 Displaying, by the first device, the video System 100

System Component(s) 120

Smart TV 110a

114a

LD 112a

Audio 15a

114c

Speech-Detection Device(s) 110b

114b

LD(s) 112b

Audio 15b

FIG. 4

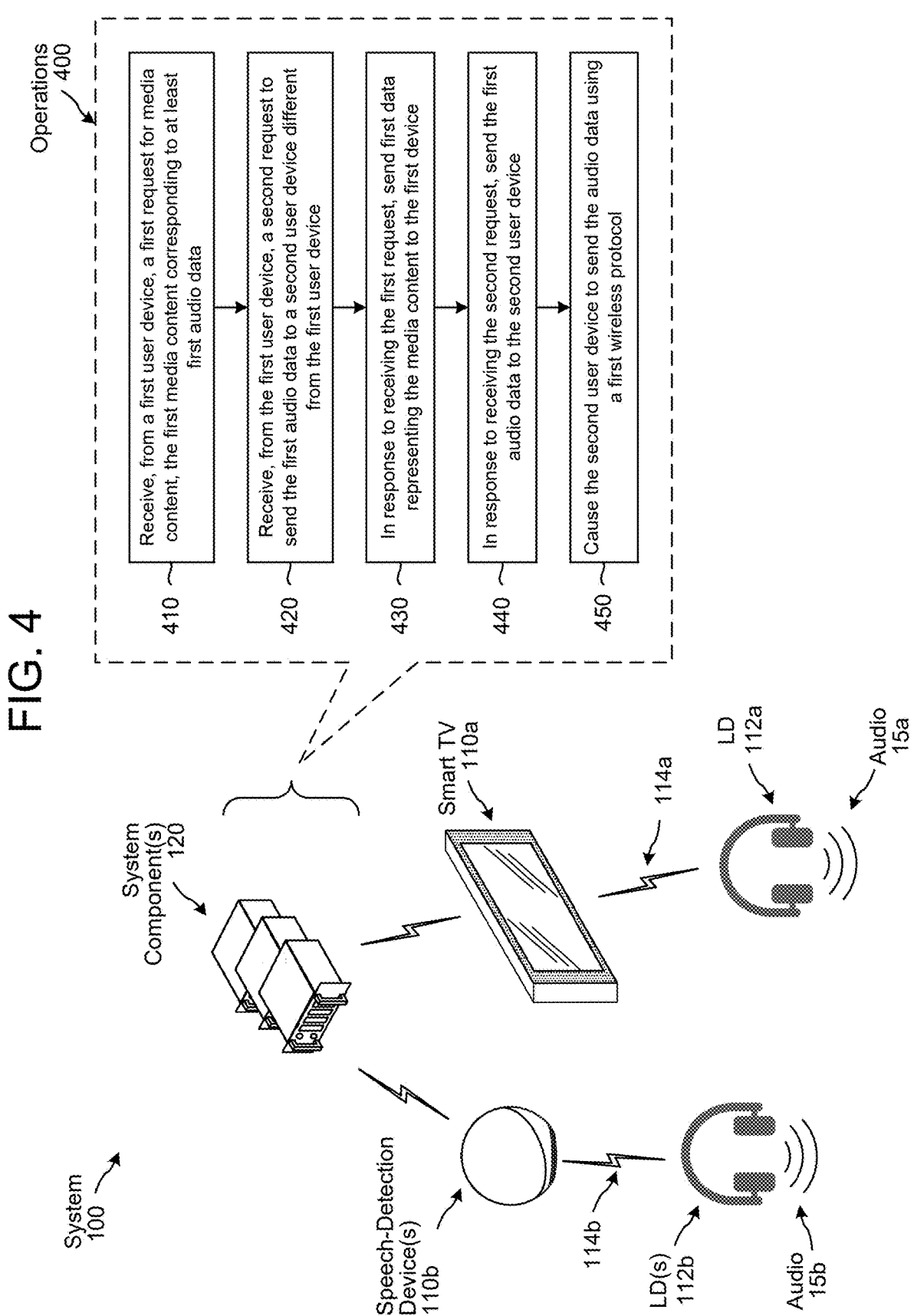

Operations
400

410 — Receive, from a first user device, a first request for media content, the first media content corresponding to at least first audio data 420 — Receive, from the first user device, a second request to send the first audio data to a second user device different from the first user device 430 — In response to receiving the first request, send first data representing the media content to the first device 440 — In response to receiving the second request, send the first audio data to the second user device 450 — Cause the second user device to send the audio data using a first wireless protocol System Component(s)
120

Smart TV
110a

114a

LD
112a

Audio
15a

System
100

Speech-Detection
Device(s)
110b

114b

LD(s)
112b

Audio
15b

FIG. 6

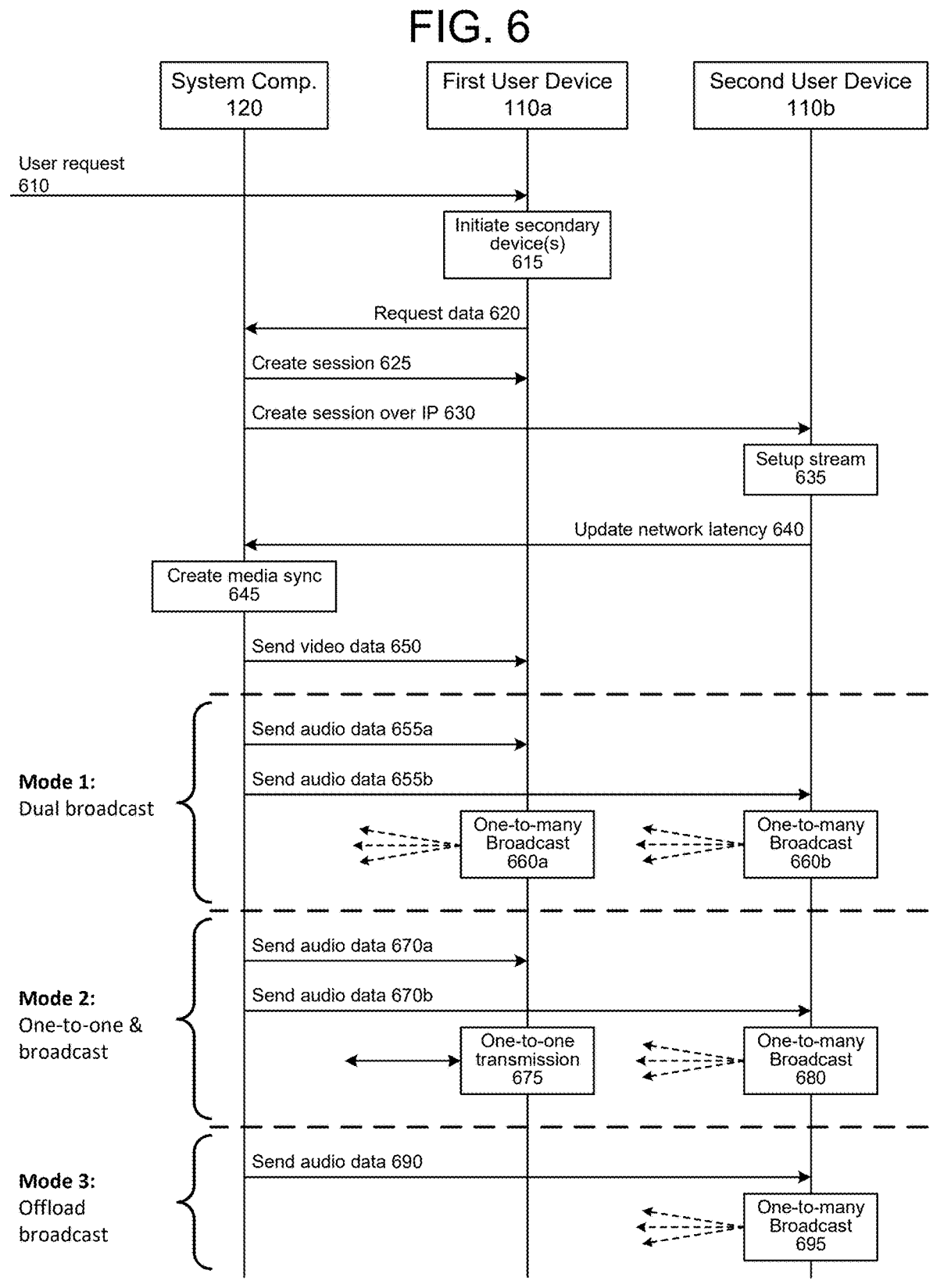

```
┌──────────────────┐   ┌──────────────────┐   ┌──────────────────┐
│  System Comp.    │   │ First User Device │   │ Second User Device│
│      120         │   │      110a         │   │      110b         │
└──────────────────┘   └──────────────────┘   └──────────────────┘
```

User request
610

Initiate secondary
device(s)
615

Request data 620

Create session 625

Create session over IP 630

Setup stream
635

Update network latency 640

Create media sync
645

Send video data 650

Mode 1:
Dual broadcast

Send audio data 655a

Send audio data 655b

One-to-many
Broadcast
660a

One-to-many
Broadcast
660b

Mode 2:
One-to-one &
broadcast

Send audio data 670a

Send audio data 670b

One-to-one
transmission
675

One-to-many
Broadcast
680

Mode 3:
Offload
broadcast

Send audio data 690

One-to-many
Broadcast
695

FIG. 8

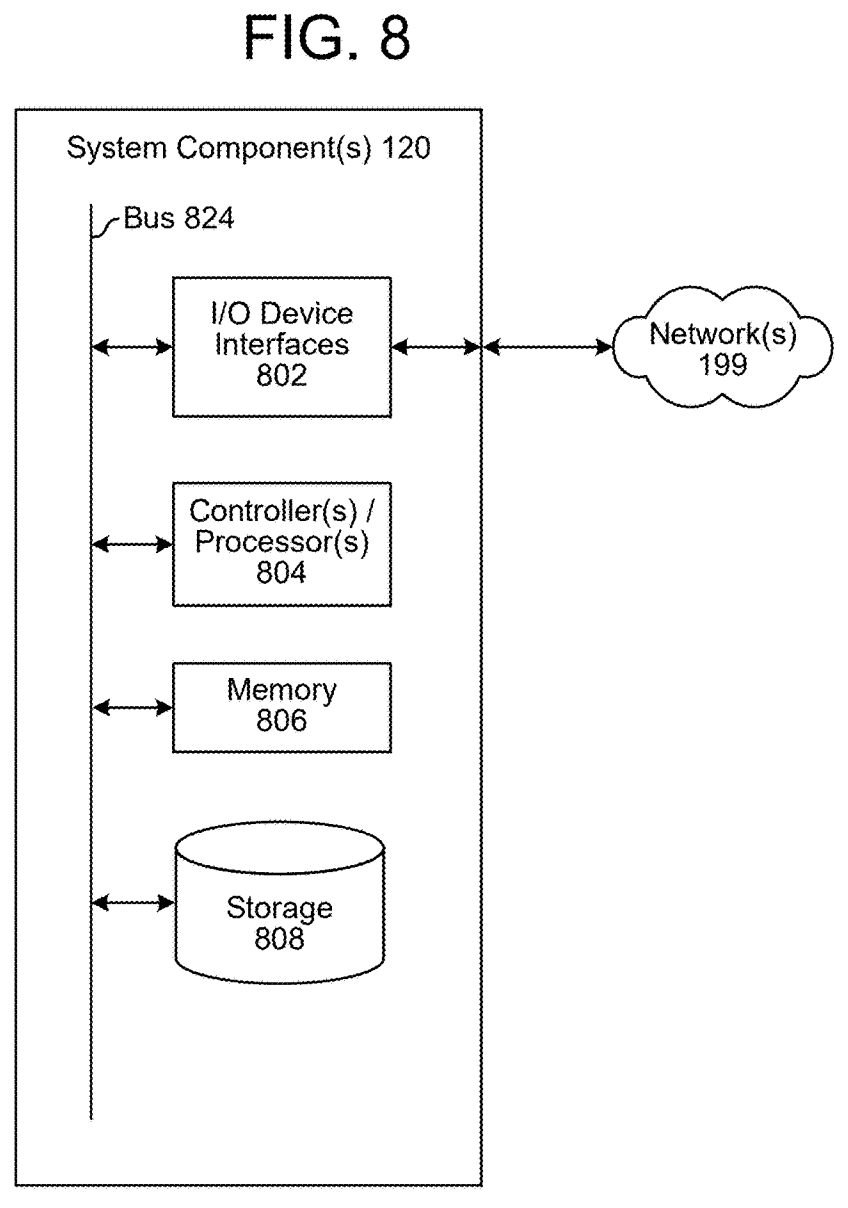

Network(s)
199

System Component(s) 120

Bus 824

I/O Device
Interfaces
802

Controller(s) /
Processor(s)
804

Memory
806

Storage
808

DYNAMIC MULTI-AUDIO BROADCASTING

BACKGROUND

Listening devices, such as earbuds, headphones, headsets, and/or other devices may be used to output audio using one or more speakers and, in some cases, capture audio using a microphone. The listening device may be configured to communicate via a wired and/or wireless connection with a personal device (e.g., a smart TV, a smartphone, laptop, etc.) and/or a one-to-many broadcast device (e.g., associated with a television, theater, conference facility, sports stadium, etc.). The listening device may receive audio data from the source device and output the corresponding audio. The audio may include, for example, music, sound effects, and/or speech from a movie, concert, meeting, sporting event, etc. In some cases, the source device may be able to send different audio content corresponding to, for example, different languages.

BRIEF DESCRIPTION OF DRAWINGS

For a more complete understanding of the present disclosure, reference is now made to the following description taken in conjunction with the accompanying drawings.

FIG. 2 is a diagram detailing example components of the dynamic multi-audio broadcasting system, according to embodiments of the present disclosure.

FIG. 3 illustrates example operations of a primary device in the dynamic multi-audio broadcasting system, according to embodiments of the present disclosure.

FIG. 4 illustrates example operations of system components of the dynamic multi-audio broadcasting system, according to embodiments of the present disclosure.

FIG. 6 is a signal flow diagram illustrating example modes of operation of the dynamic multi-audio broadcasting system, according to embodiments of the present disclosure.

FIG. 8 is a block diagram conceptually illustrating example components of a system, according to embodiments of the present disclosure.

DETAILED DESCRIPTION

Figure 1:
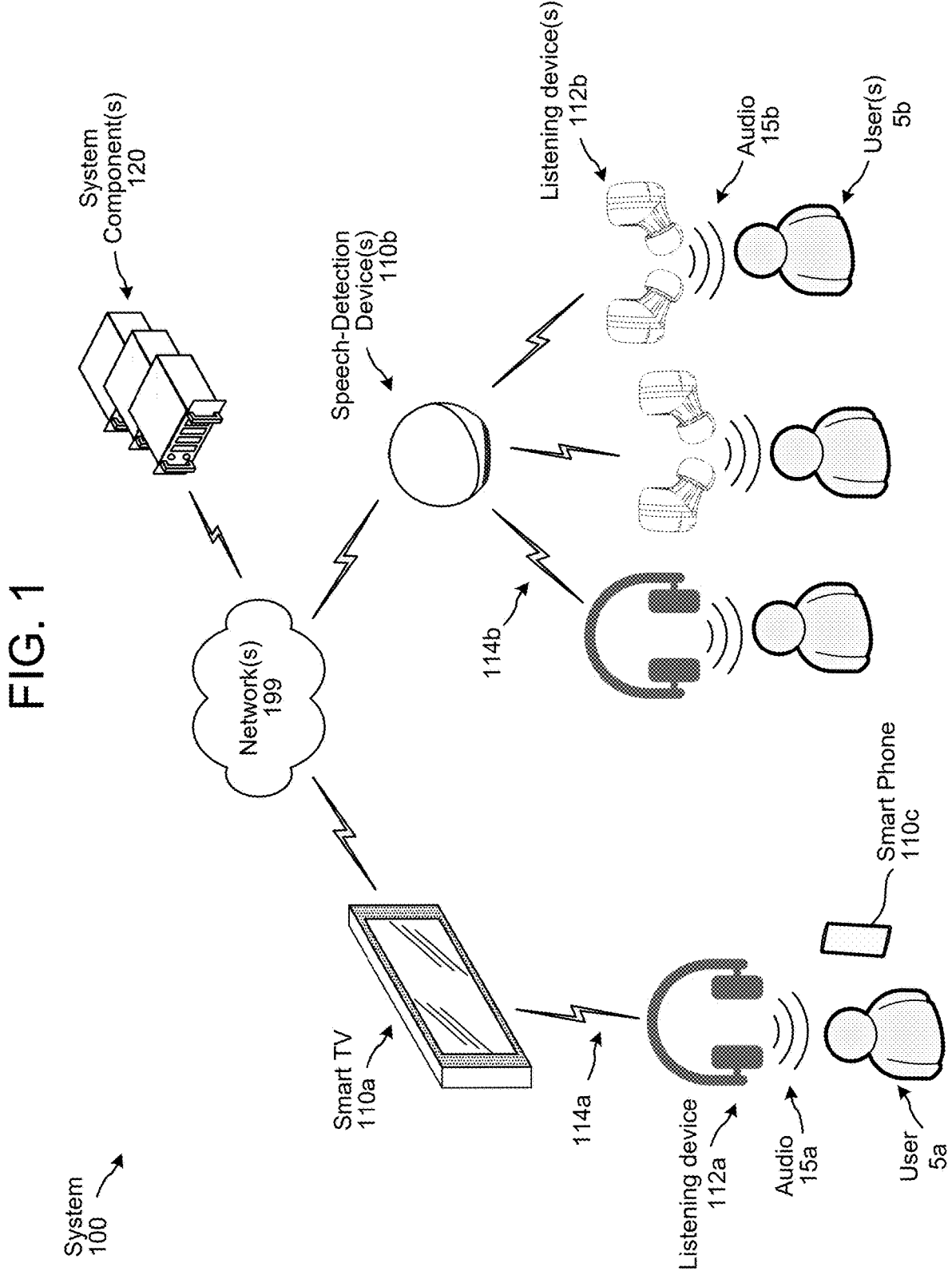
FIG. 1 illustrates a system implementing dynamic multi-audio broadcasting, according to embodiments of the present disclosure.

Personal audio output devices (e.g., "audio output devices" or "listening devices") may be carried and/or worn by a user to improve the listening experience and/or increase privacy associated with playback of audio data. Listening devices may include earphones (e.g., which may include different types of headphones and earbuds), hearing aids, speakers (e.g., for outputting audio to a room or open area), bone-conduction headphones (e.g., for transmitting audio through bones in a user's skull instead of their car canal), etc. Headphones may include over-ear and on-car types, and may be open-back or closed-back. Earbuds may include in-car types, which may form a seal within the car canal, and "open" or "classic" earbuds, which may form only a partial seal or no seal with the ear canal. Speakers may include wireless and/or portable speakers for personal listening, as well as desk/floor/wall-mounted speakers, studio monitors, etc.).

Listening devices may be used to audio data from another device; e.g., using one or more wireless communication protocols such as Bluetooth Classic Audio, which operates on the Bluetooth Classic radio, and/or Bluetooth LE Audio, which operates on the Bluetooth Low Energy (LE) radio. LE Audio offers LE Isochronous Channels, which enables Multi-Stream Audio and Broadcast Audio. Multi-Stream Audio involves a point-to-point bidirectional communication protocol with acknowledgment, and enables transmission of multiple, independent, synchronized audio streams between an audio device such as smartphone and one or more listening devices (e.g., a one-to-one wireless protocol). Broadcast Audio (e.g., Bluetooth Auracast broadcast audio) enables an audio source device to broadcast one or more audio streams to an unlimited number of listening devices (e.g., a one-to-many wireless protocol). Broadcast Audio involves a one-to-many broadcast packet transportation mechanism without acknowledgment.

Some transmitting devices may be limited to transmitting a single audio track (e.g., a single monophonic or stereophonic signal). This may be because the device has a Bluetooth Classic radio but not a Bluetooth LE radio. It may also be due to a limitation of bandwidth; for example, the device may be capable of transmitting a single audio track at a higher bandwidth, but may be constrained to a lower bandwidth when transmitting multiple audio tracks. In many cases, however, multiple users may wish to watch media content while listening to different language audio tracks in high quality.

Offered herein are systems and methods that allow a media playback system to harness multiple devices to transmit different audio tracks to different listening devices (e.g., wireless headphones or earbuds). The system may allow a primary device such as a smart TV, tablet, phone, mobile device, etc. to play video while using one or more secondary device(s) such as a smart speaker to send the corresponding audio data to one or more listening devices. The system may have several modes of operation to facilitate different use cases. In some modes, the primary device may also send audio data to one or more listening devices (e.g., using its own wireless transmitter). The audio output by the respective devices may represent different language audio tracks. In some modes, the primary and secondary devices may transmit audio data using different wireless protocols. For example, the primary device may transmit audio data using a one-to-one wireless protocol (e.g., Bluetooth Classic) while the secondary device uses a one-to-many wireless protocol (e.g., Bluetooth LE Auracast). In some cases, the system may include multiple secondary devices, each capable of transmitting a different audio track (e.g., language).

The system may verify that the primary device and secondary device(s) correspond to the same user account (e.g., to ensure that the user of the primary device is authorized to control the settings of, and output from, the secondary device). The system may check credentials from the devices and verify that they are associated with matching user profiles.

The system may employ techniques for synchronizing playback among the devices. For example, the primary device may output video and send synchronization data back to a media server or other system component, which may send the synchronization data to the primary device(s) to align output of the audio with the output of the video. Thus, speech and sound effects output by listening devices receiving audio data from the secondary device(s) will synch to the corresponding actions in the video output by the primary device. If a user pauses or scans through the video, the secondary device(s) will synchronize transmission of the audio data to match.

These and other features of the disclosure are provided as examples, and may be used in combination with each other and/or with additional features described herein. The systems and methods may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. For example, the measurements and user selections described herein may constitute medical data and thus may be subject to laws governing the use of such information. The system and techniques can be implemented on a geographic basis to ensure compliance with laws in various jurisdictions and entities in which the components of the system and/or user are located.

Figure 9:
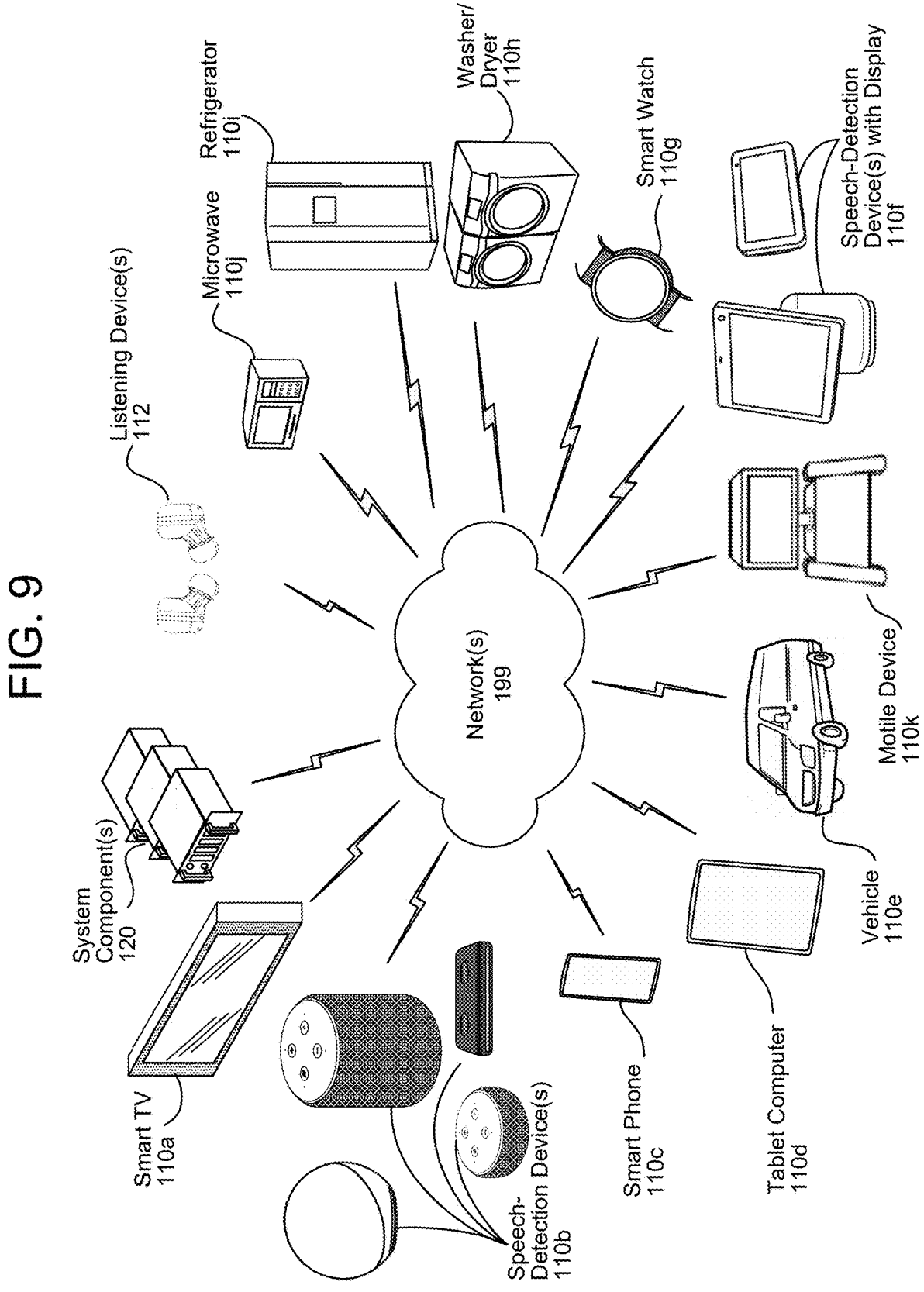
FIG. 9 illustrates an example of a computer network for use with the overall system, according to embodiments of the present disclosure.

FIG. 1 illustrates a system 100 implementing dynamic multi-audio broadcasting, according to embodiments of the present disclosure. The dynamic multi-audio broadcasting system 100 may include one or more system components 120 providing media for playback and one or more electronic user devices 110, such as a smart TV 110a and a speech-detection user device 110b, receiving and playing back the media. The user devices 110 and system component(s) 120 may communicate over one or more computer networks 199. The user device(s) 110 may transmit audio data, via wireless connections 114, to one or more listening devices 112, which may output audio 15 to a user 5. An example hardware implementation of an electronic user device 110 and/or a listening device 112 is described below with reference to FIG. 7. An example hardware implementation of a system component 120 is described below with reference to FIG. 8. In some implementations, the various devices and/or components of the system may communicate as shown in FIG. 9.

In the example system 100 shown in FIG. 1, the smart TV 110a may act as a primary playback device (e.g., a "primary device" or "first user device 110") and the speech-detection user device 110b may act as a secondary playback device (e.g., a "secondary device" or "second user device 110"). In the case of multimedia playback, the primary device may playback video while the secondary device(s) transmit the corresponding audio data to one or more listening devices. In some implementations, the primary device may also transmit audio data, which may be the same or different from the audio data transmitted by the secondary device. In some implementations, the system 100 may have multiple secondary devices. In some implementations, a user 5 may access and/or control certain features of the system 100 using an additional user device such as a smart phone 110c, remote control, wearable user device such as a smart watch, etc.

In some cases, one or more of the users 5 may wish to augment or supplement the audio data output capabilities of the primary device (e.g., first user device 110a). For example, the first user device 110a may be lack the capability to send audio data to more than one listening device

112, or may lack the capability to send more than one piece of audio data content at a time due to bandwidth and/or protocol constraints. Accordingly, the user 5 may configure the system 100 to use the secondary device (e.g., the second user device 110b) to send audio data to one or more additional users 5. The second user device 110b may have the same audio data transmitting capabilities as the first user device 110a or may have additional capabilities.

In a first example use case, the system 100 may be configured to offload audio data broadcast from the first user device 110a to the second user device 110b. A user 5a may configure the system 100 using the first user device 110a and/or may use another device such as the smart phone 110c to configure the system 100. The first user device 110a may determine whether any other user devices 110 are advertising their availability to act as a secondary device; for example, by periodically and/or occasionally transmitting data and/or metadata. The first user device 110a may receive an advertisement message and send the second user device 110b a request for information about the audio output capabilities of the second user device 110b. In some implementations, the first user device 110a may additionally request credentials such as a profile identifier and/or an authorization key, and use it to verify that the second user device 110b is associated with a same user profile. The first user device 110a may receive a response to the request indicating that the second user device 110b is capable of output audio data using a wireless protocol. In some cases, the wireless protocol may be a Bluetooth protocol, such as Bluetooth Classic Audio and/or Bluetooth Low Energy Audio (e.g., Auracast). The first user device 110a may send, via the computer network 199, coordination data to the system component(s) 120. The coordination data may represent, for example, a request for media content and a device identifier corresponding to the second user device 110b. The first user device 110a may receive streaming data representing the media content and output it; for example, as video on a display. The first user device 110a may cause the second user device 110b to transmit audio data corresponding to the media content. For example, the first user device 110a may send a request to the system component(s) 120 to send the audio data to the second user device 110b, and/or the first user device 110a may send a directive or other data indicating to the second user device 110b that it should request the audio data from the system component(s) 120. The second user device 110b may receive the audio data from the system component(s) 120 and send it, via a wireless connection 114b, to one or more listening devices 112b. The listening device(s) 112b may output the corresponding audio 15b to one or more users 5b. This use case generally corresponds to Mode 3 as illustrated in FIG. 6.

A second example use case may be a continuation of the first example use case, where the primary device also transmits audio data to one or more listening devices. The first user device 110a may send to the system component(s) a request for audio data corresponding to the media content. The audio data transmitted by the primary device may be the same or different from the audio data transmitted by the secondary device(s). The first user device 110a may receive the audio data and send it, via a wireless connection 114a, to one or more listening devices 112a. The listening device(s) 112 may output the corresponding audio 15a to the user(s) 5a. The first user device 110a may use the same wireless protocol as the second user device(s) 110b, in which case the use case may generally correspond to Mode 1 as illustrated in FIG. 6. The first user device 110a may use a one-to-one wireless protocol while the second user device(s)

110*b* uses a one-to-many wireless protocol, in which case the use case may generally correspond to Mode 2 as illustrated in FIG. 6. Other use cases may be possible including various combinations of primary devices and/or secondary devices using various wireless protocols to transmit same or different audio data. The system 100 may additionally include one or more listening devices wirelessly connected to one of the user devices 110.

As used herein, both "send" and "transmit" may refer to the act of outputting electromagnetic radiation conveying audio data in various formats, with or without a handshake, acknowledgment, and/or encryption. A one-to-one wireless protocol may refer to a connection-based protocol between two devices. The one-to-one protocol may include a handshake to open the connection and may additionally include encryption of data sent and/or acknowledgement of data received. Bluetooth Classic Audio is an example of a one-to-one wireless protocol. A one-to-many wireless protocol may refer to a protocol in which one device "broadcasts" data; for example, to any other device that may receive it or to no device at all, and generally without a handshake or acknowledgement. Bluetooth Low Energy Auracast is an example of a one-to-many wireless protocol.

Thus, the systems and methods described herein may be useful when a primary device the capability to send audio data using Bluetooth Low Energy Auracast, and/or lacks the ability the send different audio data to different listening devices. For example, a primary device capable of wirelessly transmitting audio data via only Bluetooth Classic Audio may leverage the capability of a secondary device to broadcast audio data via Bluetooth Low Energy Auracast. In another example, the primary device may be capable of broadcasting audio data via Bluetooth Low Energy Auracast, but may be limited by bandwidth constraints to only broadcasting one stream of audio data, perhaps because broadcasting streams of different audio simultaneously would result in reducing the bit rate of the audio data with a resulting drop in audio quality. Thus, the dynamic multi-audio broadcasting system 100 described herein may allow users 5 greater flexibility to configure their media playback experience.

Figure 2:
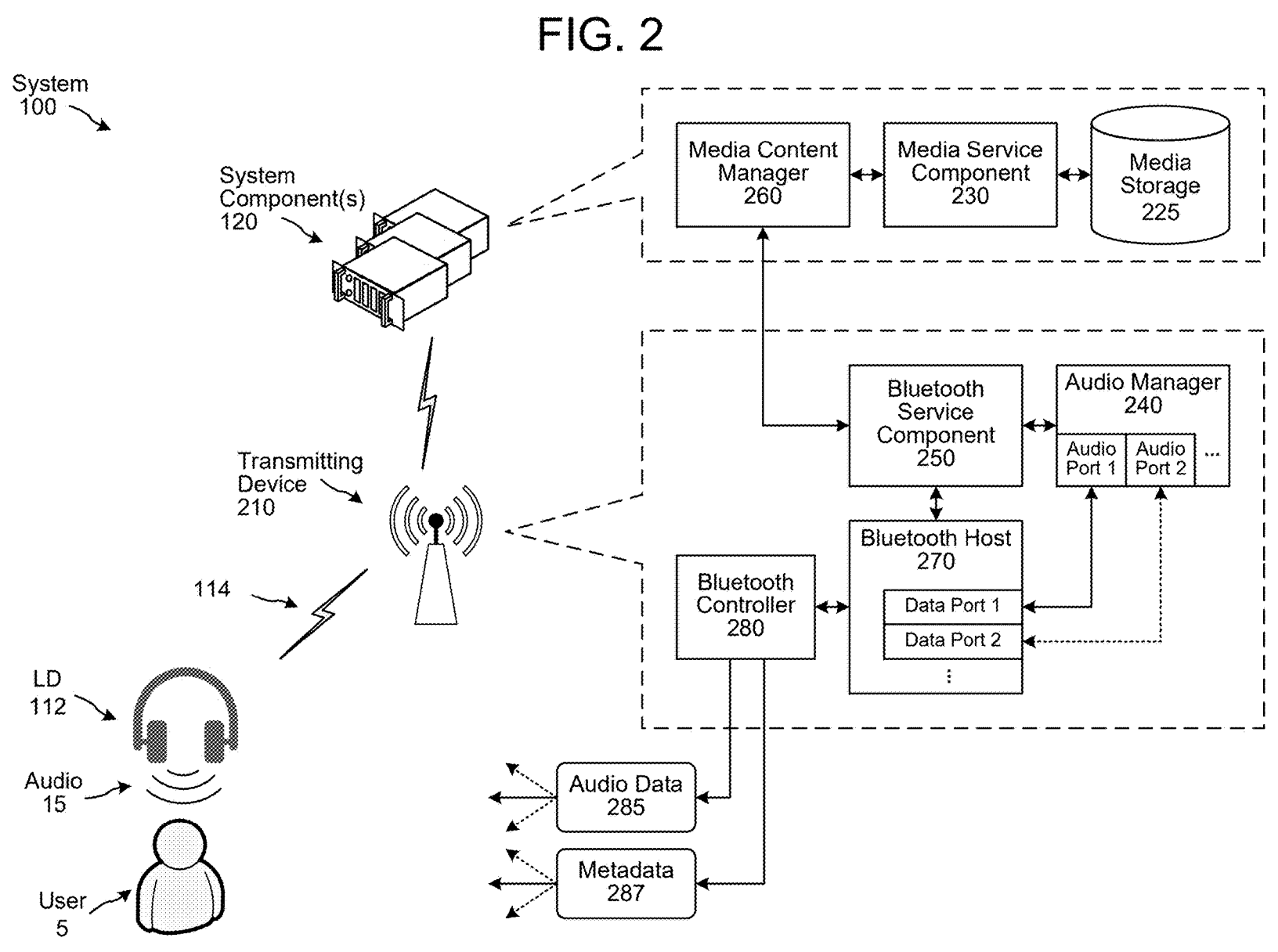

FIG. 2 is a diagram detailing example components of the dynamic multi-audio broadcasting system 100, according to embodiments of the present disclosure. The user device(s) 110 of FIG. 1 have been replaced by a transmitting device 210 for simplicity. The transmitting device 210 may represent the components and functions of a user device 110 that are engaged in receiving audio data and transmitting it wirelessly to one or more listening devices 112. The system component(s) 120 may include a media content manager 260, a media service component 230, and/or a media storage component 225. The components may include hardware, software, or a combination of hardware and software. Unless otherwise specified, the components shown in FIG. 2 may reside on a single system component 120, may be divided between two or more system components 120, and/or duplicated among two or more system components 120. Similarly, the components shown in FIG. 2 may reside on one or more system component 120, may be divided between one or more system components 120 and one or more transmitting devices 210, and/or duplicated among one or more system components 120 and one or more transmitting devices 210.

The system component(s) 120 may include a media storage component 225 that stores the media content for broadcast. In some implementations, however, the media content may be received live (e.g., in real time or on a brief delay via one or more video data and/or audio data feeds). The system component(s) 120 may include a media service component 230. The media service component 230 may be responsible for managing the media content available for streaming and/or currently being streamed by the system 100. The media service component 230 may handle requests for content by, for example retrieving the desired media item from the media storage component 225 and providing the audio data for the various audio content to the media content manager 260. The media content manager 260 may, upon request from the user 5, send the media content, including video data and/or audio data, etc. to one or more transmitting devices 210.

The transmitting device 210 may include an audio manager 240 and Bluetooth service component 250. The audio manager 240 may be based on the Bluetooth standards. In some implementations, the audio manager 240 may be modified to include multiple audio ports to facilitate streaming multiple content streams; for example, Audio Port 1 may be configured to receive audio data corresponding to a first audio content (e.g., in Mandarin), Audio Port 2 may be configured to receive audio data corresponding to a second audio content (e.g., in Spanish), and so on. Although FIG. 2 shows an audio manager 240 with two audio ports, in various implementations the audio manager 240 may have more or fewer audio ports. The number of audio ports may be adjusted based on the various audio content included in the media content, the available bandwidth of the system 100, etc.

The Bluetooth service component 250 may receive the video and/or audio data corresponding to the media content from the media content manager 260. In some implementations, the Bluetooth service component 250 may generate metadata 287 that lists audio content available for an in-progress broadcast. A listening device 112 may receive the metadata 287 and allow the user 5 to join the stream and receive the audio data and/or to select a particular audio content stream to receive (e.g., based on the user's preferred language). In some implementations, the Bluetooth service component may handle incoming requests to add particular audio content to a broadcast. For example, the Bluetooth service component 250 may receive the list of available audio content from the media content manager 260. The Bluetooth service component 250 may configure the audio manager 240 and/or the Bluetooth host component 270 for adding one or more new streams of audio content to a broadcast. The media content manager 260 may indicate to the media service component 230 to send specific data associated with specific audio content to a designated audio port for broadcast.

The Bluetooth host component 270 may include a data port for each available audio content stream; for example, Data Port 1 may be configured to receive audio data corresponding to a first audio content (e.g., in Mandarin), Data Port 2 may be configured to receive audio data corresponding to a second audio content (e.g., in Spanish), and so on. Although FIG. 2 shows a Bluetooth host component 270 with two data ports, in various implementations the Bluetooth host component 270 may have more or fewer data ports. The number of data ports may be adjusted based on the number of audio content streams included in the media content, the available bandwidth of the system 100, etc. The Bluetooth host component 270 may implement a Bluetooth host protocol stack; for example, in a manner compatible with the Bluetooth standard 5.2, the Bluetooth standard 5.4, etc. The Bluetooth host component 270 may receive audio data (e.g., via a data port) that is to be broadcast by the system 100.

The Bluetooth controller 280 may format the audio data 285 and/or metadata 287 to conform to applicable standards for transmission using a Bluetooth protocol. The Bluetooth controller 280 may also handle the turning on/turning off of one or more radios associated with Bluetooth protocol transmission and reception. In some implementations, the one or more radios may be included in the transmitting device 210. Thus, the Bluetooth controller 280 may also control synchronization of radio activation, transmission, and reception by, for example, broadcasting timing information to the user devices 110 and/or listening devices 112 and then transmitting and receiving at the specified times. The Bluetooth controller 280 may implement a Bluetooth host protocol stack; for example, in a manner compatible with the Bluetooth standard 5.2, the Bluetooth standard 5.4, etc.

In some implementations, the system 100 may implement one or more Bluetooth standards. For example, the Bluetooth controller 280 may operate according to the Bluetooth 5.2 standard. The Bluetooth host component 270 may operate according to the Bluetooth 5.3 standard. In some implementations, the system 100 may generate and transmit the metadata 287 according to the Bluetooth 5.4 standard. In various implementations, other standards may be implemented.

In some implementations, the system component(s) 120 may communicate with the transmitting device 210 over one or more computer networks 199 as shown in FIGS. 1 and 2. For example, the system component(s) 120 may reside on a back-end server that transmits content via the Internet to a different location, where the transmitting device 210 transmits the content to one or more nearby user devices 110 and/or listening devices 112. In some cases, the system component(s) 120 and the transmitting device 210 may have a direct connection via, for example, ethernet, USB, etc.

The transmitting device 210 may output metadata 287 conveying information about the audio data transmission capabilities of the transmitting device 210 (e.g., which wireless protocols it can support, available bandwidth, and/or user credentials, etc.). The primary device may receive the metadata 287 and determine that the transmitting device 210 is capable of sending audio data using a wireless protocol. The primary device may send a request to the system component(s) 120 to send audio data 285 to the transmitting device 210. The media content manager 260 may receive the request and, in response, send video data to the primary device and audio data 285 to the transmitting device 210 (and, in some cases, to the primary device as well). The transmitting device 210 may send the audio data via the protocol requested by the primary device. The listening device(s) 112 may receive the audio data and output audio 15 to the user 5.

The media content may be a live and/or prerecorded event such as a movie, classroom lecture, sporting event, television show, etc. The audio data 285 may represent audio content of the requested media content. In some cases, the audio content may correspond to, for example, a first spoken language (e.g., Mandarin). In some implementations, the wireless protocol used by the transmitting device 210 may allow for sending multiple streams of audio data. For example, the requested media content may include additional audio content; for example, corresponding to different spoken languages (e.g., Spanish). As used herein and unless otherwise specified, the term "audio content" may refer to audio data corresponding to a particular language, feed, source, etc. Audio content may include multiple channels, such as left and right channels for stereo audio, center and rear channels for surround-sound, etc. Thus, in some cases, the transmitting device 210 may, when sufficient bandwidth is available, simultaneously transmit both first language audio content and second language audio content.

In some implementations, the metadata 287 may represent, for example, an advertisement such as a Periodic Advertisement with Response (PAwR) as described in the Bluetooth specification 5.4. In some implementations, the metadata 287 may be formatted include one or more subevents. The metadata 287 may include, in its payload, the available audio content (e.g., languages) available for the media item. A subevent may have one or more audio content descriptions each, depending on how much data is used to describe the audio content. For each subevent, a subevent response slot may be available. A listening device 112 may use the subevent response slot to request particular audio content not currently broadcast by the system 100. For example, if the system 100 is broadcasting media content with three choices of audio content available, the media content manager 260 may create metadata 287 having three subevents, with each subevent having one subevent response slots. A period of the subevent may be configured based on the latency versus power consumption of the desired use case. For example, a subevent may be sent every two seconds, which may introduce a modest but acceptable amount of latency while keeping system overhead low in terms of bandwidth and processor usage.

In some implementations, the transmitting device 210 may send separate metadata 287 (e.g., separate advertisements) for different audio content and/or for advertising capabilities relating to its performance as a secondary device. In some implementations, the transmitting device 210 may send metadata 287 (e.g., a single advertisement) listing all available audio content. Listing all available audio content using a single advertisement may preserve bandwidth. In some implementations, the metadata 287 may include a payload that represents the available language as a bitmap; for example, a binary 1 may correspond to a first language, 2 may correspond to a second language, 4 may correspond to a third language, etc.

In some implementations, a user 5 may receive the audio data 285 and/or metadata 287 at a user device 110. In some implementations, the user device 110 may display a list or menu of available audio content, and the user 5 may manually select their desired audio content from the list (e.g., via a graphical user interface (GUI)). In some implementations, the user device 110 may begin receiving audio data 285 corresponding to the selected audio content, and send the audio data 285 to the listening device 112 for output as audio 15.

In some implementations, the user 5 may receive the audio data 285 and/or metadata 287 directly at the second listening device 112. In some implementations, the user may select the desired audio content via a voice user interface (e.g., VUI). For example, the system 100 may output the list of available audio content in the form of synthesized speech conveyed in the second audio 15. The system 100 may receive the user's spoken selection of audio content via a microphone of the second listening device 112 and one or more speech processing components of the system 100 (e.g., as described in further detail below with reference to FIG. 7). In some implementations, the user 5 may select and receive the desired audio content using a combination of the user device 110 and the second listening device 112 (e.g., by making an audio content selection via the user device 110 and receiving the audio data 285 at the second listening device 112 from the transmitting device 210).

In some cases, a second user may wish to a listen to different audio content from the one currently being broadcast by the system 100. The second user may receive the list of available audio content, make a selection, and begin receiving the desired audio content in a manner similar to that described for the first user 5 above. Additional users may begin receiving the media content at their respective devices and, if an additional user desires particular audio content that is not currently broadcast (or not one of various audio content currently being broadcast) the additional user may request that the system add their desired audio content to the broadcast.

In some implementations, the system 100 may include one or more features to make efficient use of the bandwidth available to the system (e.g., the transmission capabilities of the transmitting device 210 and/or the wireless band/channel it is using). For example, the transmitting device 210 may begin broadcasting a media item with no audio content or only first audio content until and/or unless additional audio content is requested. A listening device 112 and/or user device 110 that is receiving the audio data 285 may continue to request the desired audio content (e.g., ever few seconds, few minutes, etc.). The system component(s) 120 may receive the requests (e.g., via the transmitting device 210) and continue broadcasting the audio content until and/or unless it does not receive a request for the audio content for a length of time (e.g., 30 seconds, a minute, etc.). If the system component(s) determines that particular audio content has not be requested by any listening devices 112 or user devices 110 for a given length of time, the system component(s) 120 may cease broadcasting that audio content.

FIG. 3 illustrates example operations 300 of a primary device (e.g., a smart TV 110a) in the dynamic multi-audio broadcasting system 100, according to embodiments of the present disclosure. The system 100 may include a first user device (e.g., the smart TV 110a) and a second user device (e.g., speech-detection user device 110b). The first user device 110a may send audio data, via a first wireless connection 114a, to a first listening device 112a, which will output audio 15a. The second user device 110b may send audio data, via a second wireless connection 114b, to a second listening device 112b, which will output audio 15b. The first user device 110a and the second user device 110b may communicate with one or more system components 120. The first user device 110a and the second user device 110b may also communicate with each other (e.g., via a third wireless connection 114c).

A user 5 may wish to play media content on the first user device 110a while using the second user device 110b to send audio data. The user 5 may interact with the first user device 110a to configure the system 100 to stream the media content to the first user device 110a and corresponding audio content to the second user device 110b. The user 5 may interact with the first user device 110a using one or more of a menu selection, voice input, and/or text input. In some implementations, the user 5 may send commands to the first user device 110a using a separate user device such as the smart phone 110c shown in FIG. 1.

Once the user 5 has requested the desired system configuration, the operations 300 may include receiving (310), by the first user device 110a, an advertisement message transmitted wirelessly by a second user device 110b indicating wireless audio output capabilities of the second user device 110b. Various user devices 110 may periodically or occasionally transmit advertisements indicating their availability to act as secondary devices in a dynamic multi-audio broadcasting system 100. A primary device in proximity to one or more of the advertising user devices 110 may detect the advertisement and send the request (e.g., via the wireless connection 114c and/or a wired connection such as over a universal serial bus (USB)) to obtain information about the advertising device's audio data transmitting capabilities. For example, the information may include what wireless data transmission protocols the advertising device has bandwidth available for transmitting audio data, user credentials, etc.

The first user device 110a may, based on the wireless advertisement, determine (320) that the second user device 110b is available to, and capable of, communicating audio data using the first wireless protocol. The first wireless protocol indicated by the second user device 110b may be a one-to-one or a one-to-many wireless protocol. In some implementations, the wireless protocol may be Bluetooth Classic Audio or Bluetooth Low Energy Auracast, etc. The second user device 110b may indicate that it can support multiple wireless protocols and/or protocol versions.

The operations 300 may include sending (330), by the first user device 110a to the one or more system components 120, coordination data for coordinating a media stream to the first user device 110a and the second user device 110b. For example, the coordination data may represent a request for media content and a device identifier of the second user device 110b. The media content may include video data and audio data corresponding to a movie, classroom lecture, sporting event, television show, etc. The audio data may represent audio of the media event. In some cases, however, the media content may be associated with multiple items of audio content corresponding to, for example, different language audio tracks, separate commentary and ambient audio tracks, sound effects, MIDI or other control signals associated with media content playback (e.g., for controlling stage effects such as lights, smoke, mobile components of the set, etc.).

The operations 300 may include receiving (340), in response to the second request, first streaming data representing video of the media content. The first data may be, for example, video data corresponding to the media content. The operations 300 may include outputting (350), by the first user device 110a, the video. The first user device 110a may present the video on, for example, one or more displays 716.

The video may be presented in a manner that is synchronized to audio represented by audio data transmitted by the second user device 110b. For example, in some implementations, the operations 300 may further include causing the one or more system components 120 to send the first audio data to the second user device 110b to cause the second user device 110b to send the first audio data using the first wireless protocol. In some cases, the user may select a particular audio track to be transmitted by the second user device 110b. The user 5 may select the desired audio content by interacting with the first user device 110a (and/or another user device such as the smart phone 110c). Thus, the first user device 110a may send a request to the system component(s) 120 to send the requested audio data to the second user device 110b. In some cases, the system 100 may send audio data corresponding to a primary or default audio track unless the user 5 overrides the default selection. Thus, the first user device 110a may send a request to the system component(s) 120 to send the audio data to the second user device 110b. In response to the request, the system component(s) 120 may send the audio data to the second user device 110b with and/or as a directive (e.g., data representing an instruction to a computerized device to perform an action) to transmit the audio data; for example, to one or more listening devices 112b.

In some implementations, the system 100 may perform additional operations to synchronize playback of video and/or audio among the user devices 110. For example, the second user device 110b should begin transmitting audio data at the same time the first user device 110a presents the corresponding video. If the first user device 110a is also configured to transmit audio data, transmission of audio data by the first user device 110a and the second user device 110b should also occur at the same time. Additionally, if a user pauses playback, scans playback using fast forward and/or rewind, jumps to a different chapter, restarts playback, etc., the secondary devices should be updated such that the audio data starts and stops at the same time, and at the appropriate timestamp. While some playback operations may be controlled by the system component(s) 120, the system 100 may exhibit different amounts of latency between sending the audio data to the first and second user devices 110 and those user devices 110 sending the audio data to listening devices 112.

Accordingly, the system 100 may employ techniques to synchronize output of audio data among the user devices 110. For example, media content may be encoded with timestamps such as a SMPTE timecode (where SMPTE stands for the Society of Motion Picture and Television Engineers), although other methods of timecoding may be used. The timecode may be a form of media metadata used to, for example, timestamp each frame of video data. The corresponding audio data may also include a timecode that matches the corresponding video frames. The user devices 110 and system component(s) 120 of the system 100 may have an agreed upon system time such as a universal clock that each device/system can reference. When the first user device 110a begins playback, it may determine a first time (e.g., according to the universal clock) that corresponds to the beginning of playback, which may correspond to a timecode value of 00:00:00.00 (or other value). The first user device 110a may send to the second user device(s) 110b (e.g., via the system component(s) 120) synchronization data indicating a correlation between a timecode time and the system time. In some implementations, the first user device 110a may choose a time shortly in the future (e.g., 1 to several seconds) at which it will begin playback. This gap may allow for latency in sending the synchronization data to the second user device(s) 110b such that the user devices 110 can commence playback at the same time. The first user device 110a may continue to send synchronization data periodically to allow the second user devices 110b to compensate for drift and/or network interruptions. The first user device 110a may additionally or alternatively send synchronization data in response to playback events (e.g., pause, fast forward, rewind, slow motion, skipping, restarting, etc.). In this manner, output of audio 15b may be synchronized with output of the video and/or output of audio 15a.

In some implementations, the primary device may also transmit audio data, which may be the same or different from the audio data transmitted by the secondary device. Thus, the first user device 110a may send to the system component(s) 120 a request for second audio data. The second audio data may be the same or different from the audio data send to the secondary device(s) 110b. The first user device 110a may receive the second audio data and send it, via a wireless connection 114a, to one or more listening devices 112a, and the listening device(s) 112a may output the corresponding audio 15a.

In some implementations, the first user device 110a may use the same wireless protocol as the second user device(s) 110b, in which case the use case may generally correspond to Mode 1 as illustrated in FIG. 6. The first user device 110a may use a one-to-one wireless protocol while the second user device(s) 110b uses a one-to-many wireless protocol, in which case the use case may generally correspond to Mode 2 as illustrated in FIG. 6. Other use cases may be possible including various combinations of primary devices and/or secondary devices using various wireless protocols to transmit same or different audio data. For example, the system 100 may include multiple second user devices 110b. The various second user devices 110b may use the same wireless protocol or different wireless protocols from each other and/or from the first user device 110a, and/or transmit the same or different audio data as each other and/or the first user device 110a.

FIG. 4 illustrates example operations 400 of one or more system components 120 of the dynamic multi-audio broadcasting system 100, according to embodiments of the present disclosure. The system 100 may be configured similarly to the example shown in FIG. 3. The operations 400 may include receiving (410), from a first user device 110a, a first request for media content, the first media content corresponding to at least first audio data. The request may be received by a system component 120 of the system 100. The request may be to stream, for example, a movie, concert, meeting, sporting event, etc. The media service component 230 may receive the request and retrieve the requested media content from the media storage component 225. The media service component 230 may make available to the media content manager 260 data (e.g., video and/or audio data, etc.) representing the media content. The data may include multimedia content including video data and/or multiple items of audio content corresponding to, for example, different language audio tracks, separate commentary and ambient audio tracks, sound effects, MIDI or other control signals, etc. The media content manager 260 may handle streaming of the data including playback operations and/or routing audio data to secondary devices.

The operations 400 may include receiving (420), from the first user device 110a, a second request to send the first audio data to a second user device 110b different from the first user device. The media content manager 260 may determine which audio data corresponding to the media content (e.g., which language, audio feed, etc.) to send to the second user device 110b.

The operations 400 may include sending (430), in response to receiving the first request, first data representing the media content to the first device. The first data may represent, for example, video data corresponding to the requested media content. The media content manager 260 may send video data corresponding to the media content to the first user device 110a for playback (e.g., one or more displays 716).

The operations 400 may include sending (440), in response to receiving the second request, the first audio data to the second user device. The media content manager 260 may send the first audio data (e.g., representing a requested language) to the second user device 110b. The operations 400 may include causing (450), the second user device to send the audio data using a first wireless protocol. The media content manager 260 may send instructions (e.g., using one or more directives or other indication(s)) the second user device 110b regarding when and/or how to output the first audio data via a wireless connection 114b. The instructions may include a time (e.g., a system clock time or universal time) at which to begin playback. In some cases, the instructions may include a particular timestamp or timecode at which to being playback of the first audio data. The instructions may include an indication of which wireless protocol to use for transmitting the first audio data. In some implementations, the instructions may include identifiers corresponding to one or more listening devices 112 that have requested the first audio data and/or are authorized to receive it.

In some implementations, the system 100 may perform additional operations to synchronize playback of video and/or audio among the user devices 110, similar to what was described above for the example operations 300 shown in FIG. 3. For example, the media content manager 260 may receive data (e.g., in the form of events or other indication(s)) indicating playback operations (e.g., play, pause, scan, etc.). The data may include timestamp or timecode data indicating when playback began and/or stopped, and may additionally include a system clock time corresponding to the timestamp and/or playback event. The media content manager 260 may use this data to synchronize output of the first audio data by the second user device 110*b* with output of the first data by the first user device 110*a*. For example, the media content manager 260 may send the second user device 110*b* data indicating a clock time and a timestamp at which to begin playback of the first audio data. In some implementations, the first user device 110*a* may send synchronization data (e.g., timestamp and/or clock time data) to the media content manager 260 periodically during playback to account for drift due to network 199 conditions (e.g., data delayed and/or lost between the system component(s) 120 and the user device(s) 110). In some implementations, the media content manager 260 may control timing of the output of the first data by the first user device 110*a* and the first audio data by the second user device 110*b*. For example, the media content manager 260 may receive playback control signals from the first user device 110*a* and send the first data and first audio data to the user devices 110 along with timing information about when (e.g., per the system clock) and at what timestamp to begin playback.

In some implementations, the media content manager 260 may send the first audio data (and/or different audio data) to the first user device 110*a* for playback with the first data. In some case, the audio data may be different (e.g., a different language) from the first audio data sent to the second user device 110*b*. In some cases, the first user device 110*a* may output the audio data using a different wireless protocol from that used by the second user device 110*b*. In some implementations, the media content manager 260 may send the first audio data to more than one secondary device. In some implementations, the media content manager 260 may send different audio data (e.g., representing a different language or audio feed) to a different secondary device (e.g., a third user device 110). The media content manager 260 may instruct different secondary devices to output audio data using different wireless protocols.

Figure 5:
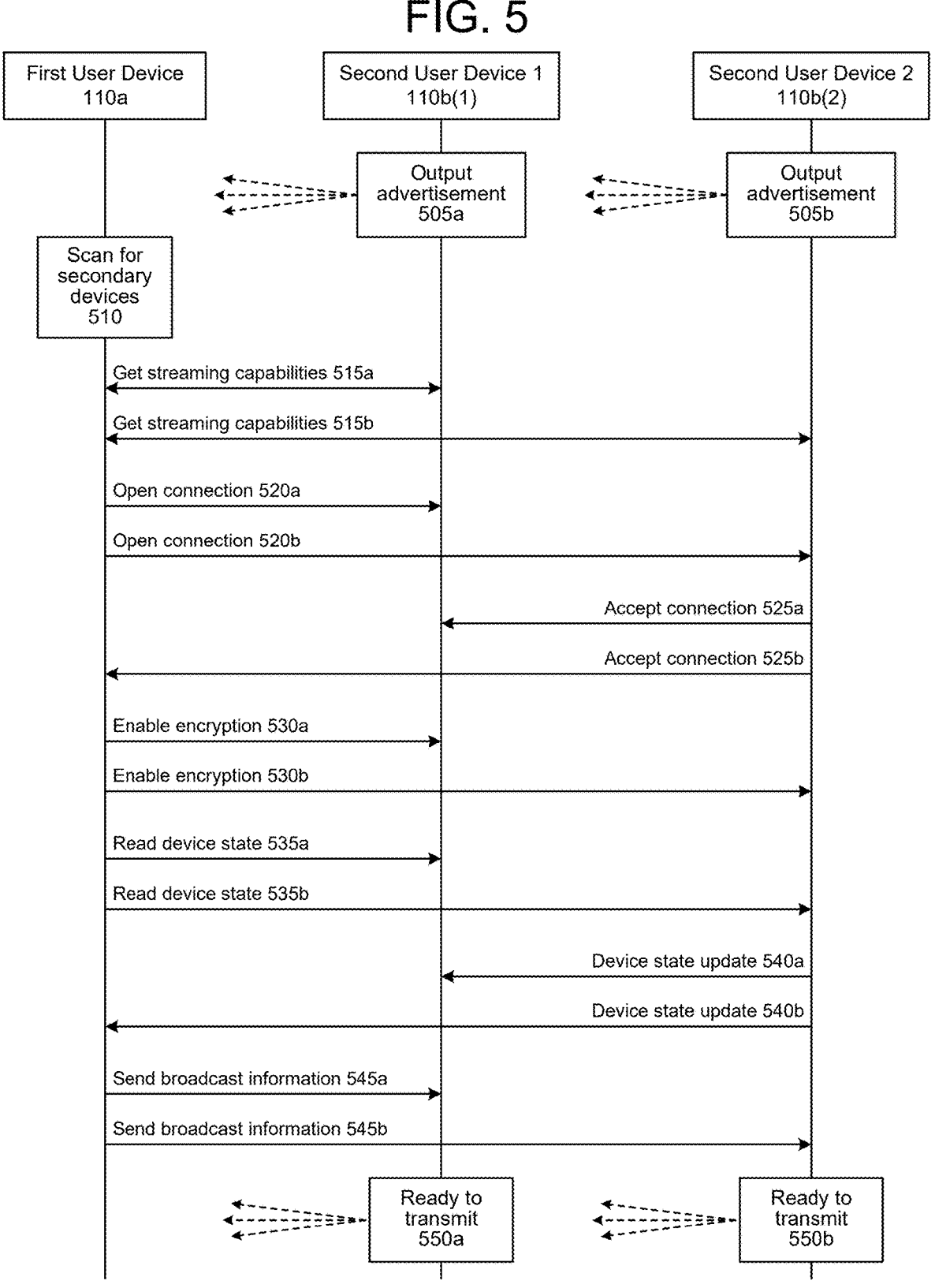
FIG. 5 is a signal flow diagram illustrating example operations of initiating the dynamic multi-audio broadcasting system, according to embodiments of the present disclosure.

FIG. 5 is a signal flow diagram illustrating example operations of initiating the dynamic multi-audio broadcasting system 100, according to embodiments of the present disclosure. The operations may be performed by a first user device 110*a* and two secondary devices: second user device 1 110*b* (1) and second user device 2 110*b* (2) (collectively, second user devices 110*b*). In various implementations, the system 100 may include a single secondary device or more than two secondary devices. The first user device 110*a* may be, for example, the smart TV 110*a* shown in FIG. 1 and/or any of the other user devices 110 described herein and/or illustrated in the accompanying drawings. The second user device(s) 110*b* may be, for example, the speech-detection user device 110*b* shown in FIG. 1 and/or any of the other user devices 110 described herein and/or illustrated in the accompanying drawings.

The second user devices 110*b* may output (505*a* and 505*b*, respectively) advertisements including metadata representing their audio data transmitting capabilities. The second user devices 110*b* may send the advertisements as, for example, Bluetooth Low Energy advertisements as described above with reference to FIG. 2. The first user device 110*a* may scan (510) for any other user device 110 that may be transmitting an advertisement to act as secondary user devices. The first user device 110*a* may detect advertisements from the second user device 1 110*b* (1) and/or the second user device 2 110*b* (2) (e.g., via a Bluetooth Low Energy radio). The first user device 110*a* may get (515*a* and 515*b*, respectively) the streaming capabilities from the second user device(s) 110*b*. The information received from the second user device(s) 110*b* may include account credentials or user registration information that the first user device 110*a* and/or system component(s) 120 may use to determine whether the second user device(s) 110*b* may be used to stream data on behalf of the first user device 110*a* (e.g., the first user device 110*a* and second user devices 110*b* are registered with the same user profile or group profile).

The first user device 110*a* may request to open connections (520*a* and 520*b*, respectively) with the second user device 1 110*b* (1) and/or the second user device 2 110*b* (2). The connections may be, for example, a Bluetooth data connection. The second user device(s) 110*b* may respond by accepting (525*a* and 525*b*, respectively) the connection requests. The first user device 110*a* may enable encryption (530*a* and 530*b*, respectively) with the second user device(s) 110*b*. The first user device 110*a* may read (535*a* and 535*b*, respectively) a device state of the second user device(s) 110*b*. The second user device(s) 110*b* may response by sending (540*a* and 540*b*, respectively) device state update information back to the first user device 110*a*. The first user device 110*a*, upon confirming that the second user devices 110*b* are capable of and/or authorized to stream data on behalf of the first user device 110*a* (and/or a user 5 of the first user device 110*a*), may send (545*a* and 545*b*, respectively) broadcast information to the second user device(s) 110*b*. The broadcast information may include details of what data and how to request that data (e.g., from the system component(s) 120) for streaming on behalf of the first user device 110*a*. The broadcast information may further include a wireless protocol to use for sending the data (e.g., a one-to-one or one-to-many wireless protocol). In some implementations, the system component(s) 120 may send the broadcast information to the second user device(s) 110*b*. The second user device 1 110*b* (1) and/or the second user device 2 110*b* (2) may then be ready (550*a* and 550*b*, respectively) to transmit the data on behalf of the first user device 110*a* (e.g., using Bluetooth Low Energy Auracast, Bluetooth Classic, etc.).

FIG. 6 is a signal flow diagram illustrating example modes of operation of the dynamic multi-audio broadcasting system 100, according to embodiments of the present disclosure. The operations may be performed by the system component(s) 120, a first user device 110*a*, and a second user device 110*b*. In various implementations, the system 100 may include a single secondary device or more than two secondary devices. The first user device 110*a* may be, for example, the smart TV 110*a* shown in FIG. 1 and/or any of the other user devices 110 described herein and/or illustrated in the accompanying drawings. The second user device 110b may be, for example, the speech-detection user device 110b shown in FIG. 1 and/or any of the other user devices 110 described herein and/or illustrated in the accompanying drawings.

A user 5 may send (610) a request, via the primary device, to stream audio data using the second user device 110b. In response, the first user device 110a may initiate (615) one or more second user devices 110b (such as the second user device 1 110b (1) and/or the second user device 2 110b (2) shown in FIG. 5) to stream data on behalf of the first user device 110a. The first user device 110a may send a request (620) to the system component(s) 120 for data; for example, audio data corresponding to media content to be output by the first user device 110a. The system component(s) 120 may create (625) a session over internet protocol (IP) with the first user device 110a for streaming data corresponding to the requested media content (e.g., video data). The system component(s) 120 may create (630) a session over IP with the second user device(s) 110b for streaming data corresponding to the media content requested by the first user device 110a (e.g., audio data). The system component(s) 120 may setup (635) the stream; for example, by using the media content manager 260 to get the requested media content from the media storage component 225 via the media service component 230 and preparing the data for transmission to the user device(s) 110.

In some implementations, the second user device 110b may send (640) data to the system component(s) 120 regarding latency for streaming data to the second user device 110b. This may allow the system component(s) 120 to create (645) a media synchronization configuration that, for example, streams data to the first user device 110a and/or second user device(s) 110b at a time that results in the respective user devices 110a and 110b to present data at the same time (e.g., audio data output by the second user device 110b will align with video data and/or audio data output by the first user device 110a). The system component(s) 120 may then send (650) the video data to the first user device 110a.

The system 100 may operate in one or more of various modes depending on the use case. In each case, the system component(s) 120 may continue to send video data to the first user device 110a as in stage 650 described above. Mode 1 may include a dual broadcast in which both the first user device 110a and the second user device 110b use a one-to-many wireless protocol to send the data to any listening devices 112 that may be in range to receive it. The system component(s) 120 may send (655a and 655b, respectively) audio data to the first user device 110a and the second user device 110b. The system component(s) 120 may send the same audio data to the user devices 110 or different audio data (e.g., a different language) to different user devices 110. The first user device 110a and the second user device(s) 110b may send (660a and 660b, respectively) the data to one or more listening devices 112 using a one-to-many wireless protocol (e.g., Bluetooth Low Energy Auracast).

Mode 2 may include a split configuration in which the second user device(s) 110b use a one-to-many wireless protocol while the first user device 110a uses a one-to-one wireless protocol (or vice-versa). The system component(s) 120 may send (670a and 670b, respectively) audio data to the first user device 110a and the second user device 110b. The system component(s) 120 may send the same audio data to the user devices 110 or different audio data (e.g., different languages) to different user devices 110. The first user device 110a may send (675) the data to a listening device 112 using a one-to-one wireless protocol (e.g., Bluetooth Classic) while the second user device(s) 110b send (680) the data to one or more listening devices 112 using a one-to-many wireless protocol (e.g., Bluetooth Low Energy Auracast).

Mode 3 may include offloading data broadcast to the second user device 110b. The system component(s) 120 may send (690) audio data to the second user device 110b. The second user device(s) 110b send (695) the data to one or more listening devices 112 using a one-to-many wireless protocol (e.g., Bluetooth Low Energy Auracast). Other use cases and/or modes may be possible within the scope of this disclosure.

Figure 7:
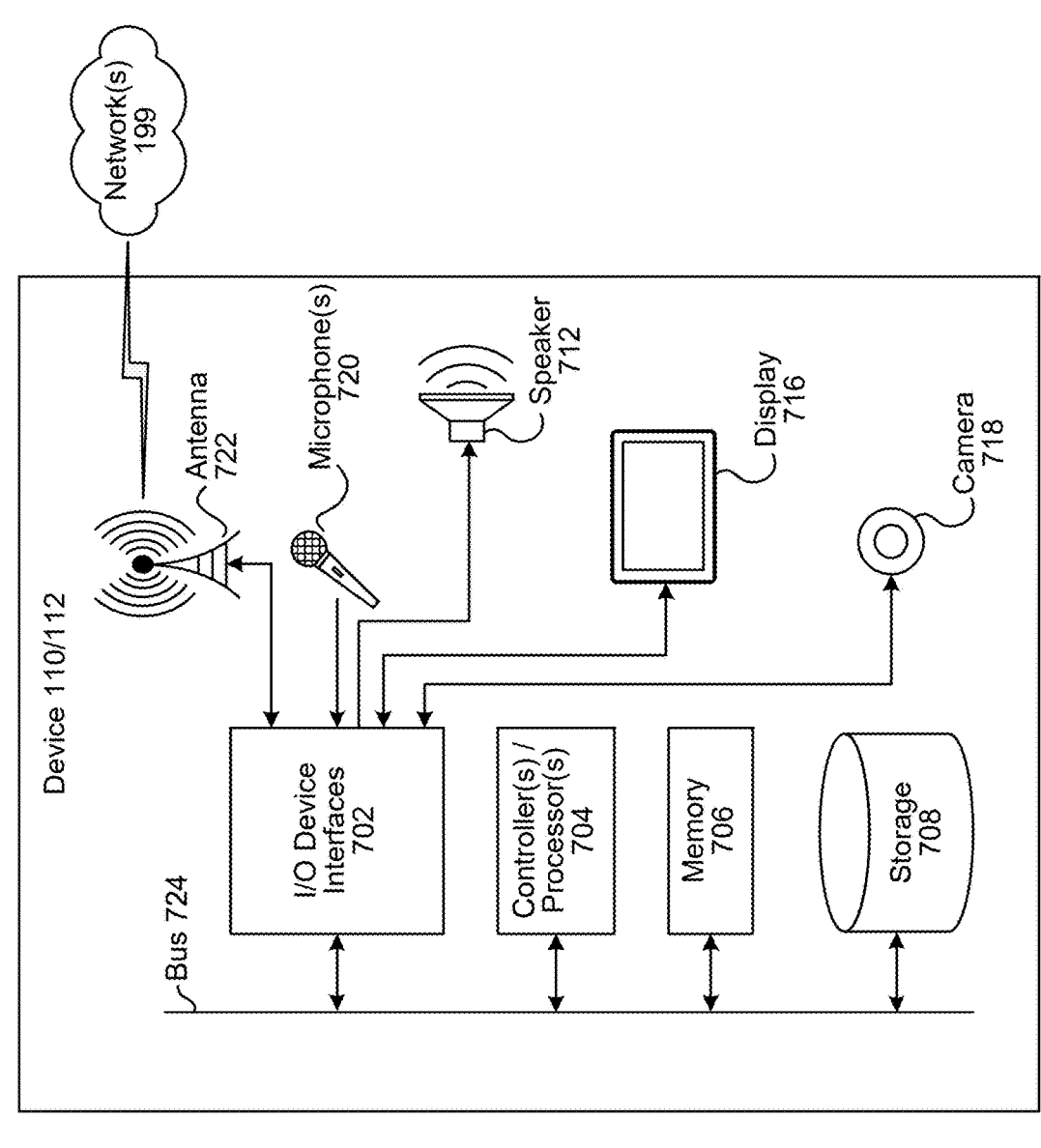
FIG. 7 is a block diagram conceptually illustrating example components of a device, according to embodiments of the present disclosure.

FIG. 7 is a block diagram conceptually illustrating an electronic user device 110 that may be used with the system 100. FIG. 8 is a block diagram conceptually illustrating an example system component 120. A system component 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) may be located remotely from the user device 110 as its operations may not require proximity to the user. The server/system component(s) may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). A system component 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components 120 may be included in the overall system 100 of the present disclosure. In operation, each of these systems may include computer-readable and computer-executable instructions that reside on the system component(s) 120, as will be discussed further below.

Each of these user devices 110 and/or system components 120 may include one or more controllers/processors (704/804), which may each include a central processing unit (CPU) for processing data and computer-readable instructions, and a memory (706/806) for storing data and instructions of the respective device. The memories (706/806) may individually include volatile random-access memory (RAM), non-volatile read only memory (ROM), non-volatile magnetoresistive memory (MRAM), and/or other types of memory. Each user device 110 and/or system component 120 may also include a data storage component (708/808) for storing data and controller/processor-executable instructions. Each data storage component (708/808) may individually include one or more non-volatile storage types such as magnetic storage, optical storage, solid-state storage, etc. Each user device 110 and/or system component 120 may also be connected to removable or external non-volatile memory and/or storage (such as a removable memory card, memory key drive, networked storage, etc.) through respective input/output device interfaces (702/802).

Computer instructions for operating each user device 110 and/or system component 120 and their various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each user device 110 and/or system component 120 includes input/output device interfaces (702/802). A variety of components may be connected through the input/output device interfaces (702/802), as will be discussed further below. Additionally, each user device 110 and/or system component 120 may include an address/data bus (724/824) for conveying data among components of the respective device. Each component within a user device 110 and/or system component 120 may also be directly connected to other components in addition to (or instead of) being connected to other components across the bus (724/824).

Referring to FIG. 7, the user device 110 may include input/output device interfaces 702 that connect to a variety of components such as an audio output component such as a speaker 712, a wired headset or a wireless headset (not illustrated), or other component capable of outputting audio. The user device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 716 for displaying content. The user device 110 may further include a camera 718.

Via antenna(s) 722, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the user device(s) 110 and/or system components 120 may include their own dedicated processors, memory, and/or storage. Alternatively, one or more of the components 120 of the user device(s) 110 and/or system components 120 may utilize the I/O interfaces (702/802), processor(s) (704/804), memory (706/806), and/or storage (708/808) of the user device(s) 110 and/or system components 120, respectively.

As noted above, multiple devices may be employed in a single system. In such a multi-device system, each of the devices may include different components for performing different aspects of the system's processing. The multiple devices may include overlapping components. The components of the user device(s) 110 and/or system components 120, as described herein, are illustrative, and may be located as a stand-alone device or may be included, in whole or in part, as a component of a larger device or system. As can be appreciated, a number of components may exist either on a system component(s) and/or on user device 110. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 9, multiple devices (110a-110k, 112, and/or 120) may contain components of the system and the devices may be connected over a network(s) 199. The network(s) 199 may include a local or private network or may include a wide network such as the Internet. Devices may be connected to the network(s) 199 through either wired or wireless connections. For example, a display/smart television 110a, a speech-detection user device 110b, a smart phone 110c, a tablet computer 110d, a vehicle 110e, a speech-detection device with display 110f, a smart watch 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the user device(s) 110, system components 120, and/or others. The support devices may connect to the network(s) 199 through a wired connection or wireless connection. Networked devices may capture audio using one-or-more built-in or connected microphones or other audio capture devices, with processing performed by components of the same device or another device connected via the network(s) 199, such as the system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
receiving, at a first electronic device, a first advertisement message transmitted wirelessly by a second electronic device different from the first electronic device, the first advertisement message indicating audio output capabilities of the second electronic device;
determining, at the first electronic device based on the first advertisement message, that the second electronic device is capable of communicating audio data using a first wireless protocol;
based on the determining that the second electronic device is capable of communicating audio data using the first wireless protocol, sending, from the first electronic device to a remote system, stream coordination data comprising a first device identifier for the second electronic device;
sending, from the first electronic device to the remote system, a request for media content corresponding to first audio data representing first audio and first video data representing first video;
receiving, at the first electronic device, streaming data including the first video data; and
causing display of the first video synchronized to transmission of the first audio data by the second electronic device.

2. The method of claim 1, wherein the first advertisement message further includes the first device identifier for the second electronic device, and wherein the method further comprises:
determining that the first electronic device is associated with a first profile identifier; and
determining that the second electronic device is associated with the first profile identifier.

3. The method of claim 1, wherein the streaming data further includes second audio data representing second audio, and further comprising:
transmitting the second audio data to a first listening device using the first wireless protocol or a second wireless protocol.

4. The method of claim 3, further comprising:
synchronizing the display of the first video to the transmitting of the second audio data; and
sending, to the remote system, synchronization data corresponding to the display of the first video, the remote system using the synchronization data to cause the second electronic device to synchronize transmitting of the first audio data with the display of the first video.

5. The method of claim 3, further comprising:
causing the second electronic device to send the first audio data using a one-to-many wireless protocol, wherein the first electronic device sends the second audio data to the first listening device using a one-to-one wireless protocol.

6. The method of claim 3, further comprising:
causing the second electronic device to send first audio data using a one-to-many wireless protocol, wherein the first electronic device sends the second audio data to the first listening device using the one-to-many wireless protocol.

7. The method of claim 1, wherein the streaming data comprises further includes second audio data representing second audio, and further comprising:
sending the second audio data to a first listening device using the first wireless protocol or a second wireless protocol;
wherein the first audio includes speech in a first language and the second audio includes speech in a second language.

8. The method of claim 1, wherein causing presentation of the first video comprises causing display of the first video on a display of the first electronic device.

9. The method of claim 1, further comprising:
receiving a command to scan output of the first video; and
synchronizing playback of first audio by the second electronic device based at least in part on the command to scan.

10. A first electronic device comprising:
one or more processors;
a wireless radio; and
one or more computer readable media storing processor executable instructions which, when executed using the one or more processors, cause the first electronic device to perform operations comprising:

periodically scanning for advertisement messages;

in response to receiving a first advertisement message transmitted wirelessly by a second electronic device different from the first electronic device, determining based on the first advertisement message that the second electronic device is capable of communicating audio data using a first wireless protocol;

based on the determining that the second electronic device is capable of communicating audio data using the first wireless protocol, sending, to a remote system, stream coordination data comprising a first device identifier for the second electronic device;

sending, from the first electronic device to the remote system, a request for media content corresponding to first audio data representing first audio and first video data representing first video;

receiving, at the first electronic device, streaming data including the first video data; and causing display of the first video synchronized to transmission of the first audio data by the second electronic device.

11. The first electronic device of claim 10, wherein the one or more computer readable media storing processor executable instructions which, when executed using the one or more processors, cause the first electronic device to perform operations further comprising:

determining that the first electronic device is associated with a first profile identifier; and determining that the second electronic device is associated with the first profile identifier.

12. The first electronic device of claim 10, wherein the streaming data further includes second audio data representing second audio, and wherein the one or more computer readable media storing processor executable instructions which, when executed using the one or more processors, cause the first electronic device to perform operations further comprising:

transmitting the second audio data to a first listening device using the first wireless protocol or a second wireless protocol.

13. The first electronic device of claim 12, wherein the one or more computer readable media storing processor executable instructions which, when executed using the one or more processors, cause the first electronic device to perform operations further comprising:

synchronizing the display of the first video to the transmitting of the second audio data; and sending, to the remote system, synchronization data corresponding to the display of the first video, the remote system using the synchronization data to cause the second electronic device to synchronize transmitting of the first audio data with the display of the first video.

14. The first electronic device of claim 12, wherein the one or more computer readable media storing processor executable instructions which, when executed using the one or more processors, cause the first electronic device to perform operations further comprising:

causing the second electronic device to send the first audio data using a one-to-many wireless protocol, wherein the first electronic device sends the second audio data to the first listening device using a one-to-one wireless protocol.

15. The first electronic device of claim 12, wherein the one or more computer readable media storing processor executable instructions which, when executed using the one or more processors, cause the first electronic device to perform operations further comprising:

causing the second electronic device to send the first audio data using a one-to-many wireless protocol, wherein the first electronic device sends the second audio data to the first listening device using the one-to-many wireless protocol.

16. The first electronic device of claim 10, wherein the streaming data further includes second audio data representing second audio, and wherein the one or more computer readable media storing processor executable instructions which, when executed using the one or more processors, cause the first electronic device to perform operations further comprising:

sending the second audio data to a first listening device using the first wireless protocol or a second wireless protocol;

wherein the first audio includes speech in a first language and the second audio includes speech in a second language.

17. The first electronic device of claim 10, wherein the first electronic device comprises a display and wherein the one or more computer readable media storing processor executable instructions which, when executed using the one or more processors, cause the first electronic device to present the first video on the display.

18. The first electronic device of claim 10, wherein the one or more computer readable media storing processor executable instructions which, when executed using the one or more processors, cause the first electronic device to perform operations comprising:

receiving a command to scan output of the first video; and synchronizing playback of first audio by the second electronic device based at least in part on the command to scan.

* * * * *